United States Patent
Barvick et al.

(10) Patent No.: US 9,536,117 B2
(45) Date of Patent: Jan. 3, 2017

(54) PLUGGABLE SMALL FORM-FACTOR UHF RFID READER

(71) Applicant: Quake Global, Inc., San Diego, CA (US)

(72) Inventors: Scott Barvick, Arlington, MA (US); Pattabhiraman Krishna, Westboro, MA (US); Hiroto Shibuya, Newton, MA (US)

(73) Assignee: Quake Global, Inc., San Diego, CA (US)

( * ) Notice: Subject to any disclaimer, the term of this patent is extended or adjusted under 35 U.S.C. 154(b) by 532 days.

(21) Appl. No.: 14/066,495

(22) Filed: Oct. 29, 2013

(65) Prior Publication Data

US 2014/0054379 A1 Feb. 27, 2014

Related U.S. Application Data

(63) Continuation of application No. 13/199,298, filed on Aug. 25, 2011, now Pat. No. 8,570,156.

(60) Provisional application No. 61/379,164, filed on Sep. 1, 2010.

(51) Int. Cl.
G08B 13/14 (2006.01)
G06K 7/10 (2006.01)

(52) U.S. Cl.
CPC ....... *G06K 7/10009* (2013.01); *G06K 7/10366* (2013.01)

(58) Field of Classification Search
None
See application file for complete search history.

(56) References Cited

U.S. PATENT DOCUMENTS

| | | | |
|---|---|---|---|
| 6,456,239 B1 * | 9/2002 | Werb | G01S 5/02 235/385 |
| 6,529,883 B1 | 3/2003 | Yee et al. | |
| 7,722,388 B1 | 5/2010 | Michaeli et al. | |
| 8,193,935 B2 * | 6/2012 | Gates | G08B 13/08 340/539.22 |
| 8,570,156 B2 | 10/2013 | Barvick et al. | |
| 2003/0083758 A1 | 5/2003 | Williamson | |
| 2004/0008114 A1 * | 1/2004 | Sawyer | G01S 7/003 340/572.1 |
| 2004/0160306 A1 * | 8/2004 | Stilp | G06K 7/0008 340/5.61 |
| 2004/0212493 A1 | 10/2004 | Stilp | |
| 2007/0194914 A1 | 8/2007 | Gates | |

(Continued)

*Primary Examiner* — Curtis King
(74) *Attorney, Agent, or Firm* — Procopio Cory Hargreaves and Savitch LLP; Pattric J. Rawlins

(57) ABSTRACT

Systems and methods for reading Radio Frequency Identified (RFID) tags. In an embodiment, an enclosure having, within it, an antenna and processor is provided. The processor may be configured to record tag observations for tag identifiers received by the antenna from RFID tags. For one or more time intervals, tag observations may be identified which satisfy a tag filter, and a confidence that RFID tags satisfying the tag filter were in the field of view of the antenna during the time interval may be computed based on the identified tag observations. According to an embodiment, reports for tag filters may be then generated using the computed confidences, and these reports may be transmitted to an external system over a network.

20 Claims, 8 Drawing Sheets

(56) References Cited

U.S. PATENT DOCUMENTS

| | | | |
|---|---|---|---|
| 2008/0278292 A1* | 11/2008 | Nierenberg | G08C 21/00 340/10.3 |
| 2009/0101712 A1* | 4/2009 | Ulrich | G06Q 10/087 235/383 |
| 2009/0174569 A1 | 7/2009 | Smith et al. | |
| 2009/0322510 A1 | 12/2009 | Berger et al. | |
| 2010/0007498 A1 | 1/2010 | Jackson | |
| 2010/0039228 A1* | 2/2010 | Sadr | G01S 5/12 340/10.1 |
| 2010/0096461 A1 | 4/2010 | Kotlarsky et al. | |
| 2010/0250305 A1* | 9/2010 | Lee | G06Q 10/06316 705/7.26 |
| 2011/0050400 A1 | 3/2011 | Ho et al. | |
| 2012/0092134 A1 | 4/2012 | Stern et al. | |

\* cited by examiner

PLUGGABLE SMALL FORM-FACTOR UHF RFID READER

PRIORITY

This application claims priority, as a continuation, to U.S. patent application Ser. No. 13/199,298, filed on Aug. 25, 2011, and titled "Pluggable Small Form-Factor UHF RFID Reader," which, in turn, claims priority to U.S. Provisional Patent App. No. 61/379,164, filed on Sep. 1, 2010, and titled "Pluggable Small Form-Factor UHF RFID Reader," the entireties of both of which are hereby incorporated herein by reference.

FIELD OF THE INVENTION

The invention is in the field of Radio Frequency Identification (RFID).

BACKGROUND OF THE INVENTION

The present disclosure relates to a Radio Frequency Identification (RFID) system that may be generally known as an embodiment of an RFID reader, and, more specifically, to a system having novel features related to packaging, power supply, network connectivity, thermal management, and Reader system design.

The technique of identifying objects using radio frequency communications has been eponymously called Radio frequency identification (RFID).

RFID systems have been employed in an increasingly wide range of applications such as retail supply chain, postal logistics, healthcare, manufacturing, retail stores and airport baggage tracking. In retail supply chain applications, RFID has been used to track and trace goods throughout the supply chain, automate the receipt of pallets of shipments at distribution centers, increase shipping accuracy of goods from distribution centers (DCs) to stores, and manage inventory throughout the supply chain. In postal logistics FRID have been used to monitor the quality of service of postal shipments for international and national mail systems. For instance, a global postal organization has deployed RFID to over 40 countries around the world (and increasing) to measure and monitor quality of service of mail delivered between those countries. In healthcare, RFID is being used for asset and resource management, patient and staff tracking for improving patient flow within hospitals. In airports, specifically baggage tracking, RFID is being used as a replacement to barcode for quicker and more secure and accurate transfer of bags to improve the overall baggage handling rate.

Accordingly, RFID systems have been increasingly employed in diverse applications to facilitate the identification and tracking of merchandise, personnel, and other items and/or individuals that need to be reliably monitored and/or controlled within a particular environment. The introduction of RFID into these applications has resulted in a more secure, efficient and accurate system.

BRIEF DESCRIPTION OF THE RELATED ART

A conventional RFID system typically includes at least one RFID transponder or tag, at least one RFID Reader (or interchangeably referred to as interrogator), and at least one controller or server. The readers inventory the tags and forward the data to the server or controller.

At the physical layer of a passive UHF RFID system, RFID tags communicate by 'backscattering' signals that are concurrent with reader transmissions, and use a variety of frequencies and encodings under the control of the reader. This is in contrast to earlier HF tags based on inductive coupling that only provide read ranges of centimeters, and active tags that require batteries to increase range. There is a class of tags called Battery Assisted Passive (BAP) that may also be of interest. For some applications, more range or link margin may be needed than a passive tag, especially in environments with metals and water in which electromagnetic waves experience strong attenuation. More link margin may lead to better reading reliability and better interference control in harsh environments. BAP tags may overcome the read sensitivity limitation of passive tags by adding a battery to power the chip. The RF signal is now only used to carry the information not to supply power to the chip. These tags retain the reverse link of passive tags, i.e., backscatter the response. BAP tags fill the gap between purely passive tags and the more costly (battery-powered) active tags.

Each RFID reader typically follows a predefined sequence or protocol to interrogate and retrieve data from one or more RFID tags within the RF field of the reader (also known as the interrogation zone of the reader). It is noted that the interrogation zone of a reader is generally determined by the physical positioning and orientation of the reader relative to the tags and the setting of various parameters (e.g., the transmit power) employed by the reader during the interrogation sequence. In systems employing passive tags, the interrogation zone is typically defined by the power-coupling zone. For example, a typical interrogation sequence performed by an RFID reader includes transmitting a continuous wave (CW) to one or more passive tags within the reader's interrogation zone to power the tags, and transmitting a message packet (e.g., a request or command) by modulating the carrier signal. The passive tag then reads the message packet while tapping some of the energy of the CW to maintain its power. The message packet typically identifies one or a subset of the tags within the interrogation zone as the designated target of the message packet, and provides a request or command that the designated tag is expected to perform. After the passive tag reads the information carried by the modulated carrier signal, the tag appropriately modulates the CW, and reflects a portion of the modulated wave back to the reader by changing the reflection characteristics of its antenna via a technique known as backscatter modulation.

The physical and logical layers of the communication between the Reader and the tag are defined by the air protocol. Specifically, the air protocol defines the signaling layer of the communication link, the Reader and tag operating procedures and commands, and the collision arbitration (also known as singulation) scheme to identify a specific tag in a multiple-tag environment. The worldwide standard air protocol in the UHF band is currently the EPCGlobal Class-1 Generation 2 (ISO 18000-6c) protocol. The present disclosure may use the Gen2 air protocol for the reader-to-tag communication, although the present disclosure should not be limited in this regard.

The collision arbitration (i.e., singulation) algorithm used in the Gen2 protocol is called the Q algorithm and is a variant of the slotted Aloha protocol. At the beginning of a round, the reader broadcasts the round size S to all the tags in its field of view. Each tag upon receipt of this initial message, generates a pseudo-random number between 1 and S. That becomes the target time-slot in which the tag responds. The reader is the time-keeper and advances time by sending slot messages to the tags. Each tag decrements its target slot counter—when it hits zero, the tag responds to the reader. At the reader receive side, the reader listens for tag response each slot. If exactly one tag responds, it initiates the state-machine to transact with the tag. In the case of a collision or an 'empty' slot, the reader either decides to resize S and start a new round or proceeds with this round. This is how a single RFID reader is able to identify multiple tags in a rapid manner. For example, the singulation rate in a dense reader environment is roughly 200 tags/second.

The communication protocol used between the reader and the controller or server is called a reader protocol. The EPCGlobal Low Level Reader Protocol (LLRP) is currently the standard reader protocol that is employed by most of the conventional readers around the world. The present disclosure may use the LLRP protocol for the reader-to-server communication, although the present disclosure should not be limited in this regard.

UHF RFID readers operate in the ISM band and are prone to external interference from cordless telephones, wireless headsets, wireless data networks. In addition, there may be interference due to other co-located readers. Each reader's RF receiver front end must be designed to withstand high-interference signal levels without introducing distortion that can cause tag response decoding errors. The receiver noise needs to be low so that it has sufficient dynamic range (Transmit power—Received Signal power from the tag) to allow error-free detection of low-level responding tag signals.

A forward link limited system may be limited by the receive sensitivity of the tag and hence beyond a certain distance there may not be enough RF energy incident on the tag to energize it and then subsequently backscatter its response. On the other hand, a reverse-link limited may be limited by the receive sensitivity of the reader, and hence beyond a certain distance between the tag and the reader, the reader may not be able to decode the tag responses correctly. Passive UHF RFID systems are typically forward link limited. That is because the state-of-the-art reader manufacturers have done a very good job in designing in sufficiently high dynamic range such that a reader is never backscatter limited for passive UHF tags. The dynamic range of the state of the art UHF reader is about 120 dBm and improving. A 120 dBm dynamic range gives a RF link budget of 60 dBm each way—thus, starting at a transmit power 30 dB with a 6 dB gain, and the forward link budget of 60 dBm, the limiting receive signal strength at the tag is −24 dB, which is much lower than the receive sensitivity of the best tag available in the marketplace of −18 dBm. Thus, the bottleneck with conventional UHF readers and passive tags, is the forward link to the tag.

However, if a battery assisted passive (BAP) tag is used, a different result may occur. The receive sensitivity of the state of the art BAP tag is −30 dBm. This means that even at the limit (or the reader's dynamic range) and beyond it, the BAP tag can be powered and respond to the reader's signal. This means that the system becomes reverse-link limited when interrogating BAP tags. This places stress on the design and implementation of the reader's receive path.

Conventional reader designs are focused on optimizing the forward-link and hence are designed to efficiently interrogate passive UHF tags. These readers are not able to extract the maximal performance (read range and immunity to interference) of a BAP tag.

Conventional readers typically come in mobile handheld or fixed form-factors. A mobile handheld reader is a reader that can be typically carried by a human when he/she would like to inventory or search for tagged items. These interrogators obtain power internally from batteries that are charged through a variety of means. Typical use-case requirements have driven the conventional handheld readers to have a read range requirement substantially less than a fixed reader. The design focus of these readers have been more on the bulkiness, weight, aesthetics, and less on the read range. These readers are hence integrated antenna readers and have a smaller antenna typically 1-4 square inches in size. The start and stop of the reads are controlled by the human pressing a trigger on the handheld device.

A fixed reader is a reader whose antenna(s) may be fixed to a structure which in itself could be fixed or moving. A conventional fixed RFID interrogator typically comprises at least one antenna port for attaching antennas either as an integrated component of the system or externally connected by a coaxial cable. In addition, some of the conventional readers have one or more general purpose digital input and output ports. These ports are used to receive input from auxiliary devices like motion sensors or actuators, and output data to auxiliary devices like displays or lights. These interrogators typically obtain power internally from batteries (charged through a variety of means) or externally through DC power sources such as AC/DC converters or Power-over-Ethernet. The packaging of conventional interrogators is typically based on minimizing the packaging within the constraints of the thermal management requirements. Other packaging options are designed to satisfy environmental requirements such as the ability to operate in outdoor settings. Current state of the art RFID interrogators primarily have external antennas which require additional coaxial cables for connection of the antennas to the antenna ports on the interrogator. There exist devices that have included an antenna within the overall enclosure of the reader or permanently attached to the interrogator electronics such that they are known as integrated readers. These devices, except where mobility using battery power for short range and timeframe operation is the goal, traditionally utilize existing antenna design using air between the radiating patch and the ground. This results in typical antennas in the 9 square inch range for internal uses. When integrated with readers, the overall reader form factor cannot be less than the antenna dimensions and is often substantially greater. The network side communication with the host computer or controller device happens over Ethernet for most of the conventional readers. The start and stop of the reads of these fixed readers are controlled either via real-time commands from a controller or via software running on the reader based on the read configuration parameters stored in the reader by a host computer or controller.

During the many years of deploying RFID using the conventional readers, it was realized that RFID system deployment of UHF system turned out to be cumbersome to a customer, very heavy on the infrastructure, sometimes intrusive to the workflow and ultimately expensive. The customer had to construct portals and structures to mount the bulky antennas and readers, pull Ethernet cables for connectivity and power, and install new power outlets. From a commercial perspective, the heavy infrastructure requirements dissuaded the customers from deploying RFID in a pervasive manner.

SUMMARY OF THE INVENTION

A Pluggable small form-factor UHF RFID reader that contains in an enclosure a host CPU, volatile and non-volatile memory, power inputs, digital circuitry including the CPU and supporting components, analog circuitry including the power and RF components, antennas, networking components, user interface components, debug and test component. The enclosure has thermal dissipation capacity, radio frequency transparency with WiFi and RFID antennas, protective abilities from physical and radiofrequency perspectives, the ability to mount the device to an AC outlet or flush to a solid wall or surface or at an angle to a solid wall or surface, the ability to be connected to PoE or DC inputs, and the ability to convert AC/DC current. The reader also is RFID setting configurable, employs intelligent filtering and smoothing algorithms and transmits only relevant summarized information back over the network, and allows for easy firmware management and real-time monitoring. The reader can also communicate via 802.11 WiFi or Ethernet.

DETAILED DESCRIPTION

In the present disclosure, a new RFID interrogator device is discussed that addresses the infrastructure concerns of conventional RFID in a unique and innovative manner. The new reader is an extremely flexible and configurable device.

Firstly, it is light weight and has a small form-factor.

Secondly, the reader design embraces the variability in the layout and the constraints encountered at different deployment sites. The reader can be directly plugged into an AC outlet, or mounted on a wall away from the AC outlet or mounted on the ceiling. The reader can be powered via AC or DC, through an external AC/DC converter or power over Ethernet (PoE). The reader can communicate via 802.11 WiFi or Ethernet—enabling a variety of lightweight deployment options.

Thirdly, in addition to the reader placement flexibility, the reader itself is extremely configurable in terms of RFID settings.

Fourthly, the reader employs intelligent filtering and smoothing algorithms and transmits only relevant summarized information back over the network. In this way, it consumes only the required amount of network bandwidth and not more, satisfying goals for lightweight usage of the network infrastructure.

Last but not the least, the reader design allows for easy firmware management and real-time monitoring to ensure that a large number of devices are able to be deployed and managed with a minimum of resources.

All these features and capabilities truly enable a large-scale deployment of passive RFID which is lightweight in all aspects, easy to deploy, and easy to manage and monitor.

In accordance with the present disclosure, an RFID interrogator device is disclosed that provides for novel use of power inputs, physical size reductions, RFID system design, and software algorithms to facilitate deployment opportunities where they have not existed previously. It may comprise the following components. Other embodiments of the present disclosure may organize, aggregate, or disaggregate the components in various ways, and may add additional components, but the primary components providing the basic capabilities are typically:

Host CPU.
Volatile and non-volatile memory.
Power inputs.
Digital circuitry including the CPU and supporting components.
Analog circuitry including the power and RF components.
Antennas.
Networking components.
User interface components.
Debug and test components.
Enclosure.

Figure 1:
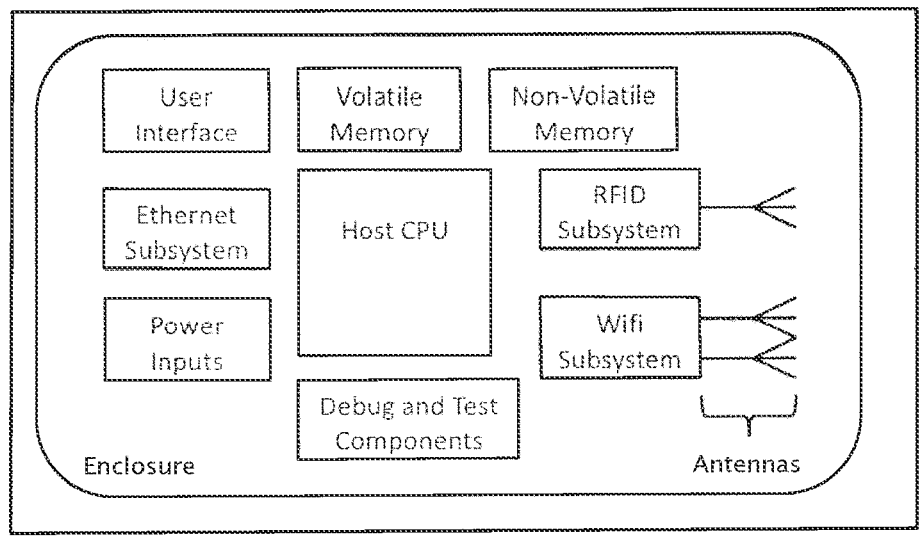
FIG. 1 is a diagrammatic representation of an exemplary RFID system, within which an embodiment of the present disclosure may be implemented.

FIG. 1 is a block diagram that demonstrates one organization of these components into an interrogator device. The text shown in the diagram in FIG. 1 describes each of the components.

As seen in FIG. 1, the Host CPU may be responsible for running the software that provides the overall control of the system which includes, but is not limited to, controlling the RFID operation, receiving and processing tag information from the RFID subsystem, managing the overall system configuration, using the networking components to send and receive data to external systems, processing and sending user interface inputs and outputs to both physical and software-based interfaces, managing the input and output of certain debugging information, and reading and writing information to and from the memory. The host CPU is typically chosen based on the tradeoff among the parameters of cost, computing power, and power requirements.

The volatile memory may be used by the host CPU for runtime storage of program, configuration, and operational data. Program data and possibly configuration may be loaded into this memory at startup time, and it may be accessed in the course of executing the programs by the host CPU. The runtime data and possibly configuration data may be written, read, and deleted throughout the course of executing the programs by the host CPU. All information in the volatile memory may be lost when power is removed from the device.

The non-volatile memory may store program and configuration and possibly critical data derived during operation of the device in such a way that it may not be lost when power is removed from the system. The non-volatile memory may be organized into different logical partitions to facilitate the storage of different types of control programs.

The user interface indicated on the block diagram may consist of the physical capabilities that can provide user interface functions, such as buttons, LEDs, and LCD displays. This component is not intended to represent the many types of software-based user interfaces that are possible such as command line interfaces provided to terminals, and web browser-based interfaces that would be served over a network connection. The physical user interfaces on the device may be as simple as a configuration reset button to allow for recovery from catastrophic configuration errors and/or image failures along with an LED to represent basic operational status. Additional physical devices can provide additional user control and data representation. These include LCD displays, a multiplicity of LEDs, or LEDs with multiple colors. Sound outputs to represent certain conditions are also possible.

The Ethernet subsystem may provide one form of network connectivity for this device. Ethernet is present in most environments where networking is required and its state in these environments is very reliable. Most devices that are not solely mobile devices and are large enough to hold the Ethernet connector have this type of network connectivity. There are different classes of Ethernet support, primarily distinguished by the link speed supported in Mbps. The different classes for devices in this general category are 10, 100, and 1000 Mbps. The chips that provide Ethernet capabilities for general usage usually support either 10 and 100 together or all three, and the switches that are typically connected to devices with the common chips typically automatically detect and negotiate the highest mutually compatible speed at which to operate the link. One additional capability that can be provided over the Ethernet physical interface is power. Power-over-Ethernet is defined by the IEEE 802.3af standard, and this method of powering a device using the Ethernet connection is discussed in the next section.

The disclosed device is able to obtain power through a multiplicity of sources, each consistent with the goal of providing an RFID interrogator that significantly eases the deployment burden. Any of three methods can be used to power the device, without regard to more than one being used in combination; DC power from an external power source, power-over-Ethernet (also DC, but provided over the Ethernet cable), or through an internal AC/DC converter power supply with a standard plug such that the device can be directly plugged into any standard AC outlet. Connectors are provided for each of these forms of input; a DC barrel jack, a PoE compatible RJ-45 (8P8C), and an AC plug appropriate for the installation, respectively. Furthermore, because AC outlets are deployed with either the ground plug above the live and neutral terminals or below them, a method of providing simple accommodation of either orientation of the terminals on the AC outlet is disclosed.

Debugging and testing components are deployed on most systems to aid the development, manufacturing and/or support processes. The implementations vary, but examples include additional test contacts for critical signals so that in-circuit test (ICT) fixtures can be used and serial port connectors that can be exposed by Engineering resources for non-production access to the debug ports on components within the device. Higher level, software-only, debugging capabilities may exist as well, but this class of capability may not require hardware support beyond interface access to the components that are already in the system. The communication of the data to the external system may be provided entirely by the CPU and the networking components.

The wireless data communication capability that is central to the simplified deployment value of this device is provided by the IEEE 802.11 standards known as "WiFi". This widely available wireless networking capability allows for this device, in one embodiment, which receives power by simply inserting into a free AC socket or through an external DC source, to be connected to an enterprise networking infrastructure quickly and easily (i.e. without the costly deployment of Ethernet wires). There are several specifications in the IEEE 802.11 family of standards, known as 802.11a, b, g, and n. The features and data transfer speed of each successive standard, 802.11n being the most recent addition, continue to increase. However, products in the WiFi space continue to be used long after a newer technology is available, so most products that support one version of WiFi support more than one of the technologies. As shown in the block diagram, embodiments of the WiFi subsystem can support more than one antenna. More than one antenna can be used to increase antenna diversity or to support the different technologies and therefore different frequencies of the different IEEE 802.11 standards. As with the Ethernet chips that are used in embodiments of the present disclosure, the chips that provide the WiFi processing typically support more than one of the different standards. Configuration enabled through software as well as the system and antenna design may enable the desired protocols.

The RFID subsystem is typically a fundamental component of any embodiment of an RFID interrogator device. This subsystem can be thought of as has having two "sides", the digital side and the analog side. The digital side may consist of the control interface from the host CPU and the software implementation of the specific air interface protocol. Between the two sides, a digital/analog conversion of the signal may take place. This can be accomplished in a number of ways, but typical implementations utilize purpose-built chips to accomplish this conversion for RFID as well as accomplishing as much of the digital and analog processing as possible. The analog side may generate the modulated output waveforms and the received signal filtering. Additional capabilities can include signal processing to cancel noise and reflected signals received by the receiver. The analog side of the implementation typically requires discrete analog components that are used to electrically match the connections to the antenna, amplify the transmit signal to the desired output power, possibly attenuate the received or reflected signal as a protection mechanism, and possibly tap off the signal to use for the noise and reflection cancellation. The analog side of the implementation should be carefully designed to meet the required performance and cost requirements of any RFID interrogation device.

The antennas for a system as disclosed in this patent are typically necessary for both the RFID subsystem and the WiFi system. Furthermore, passive RFID technology may have different transmission frequencies and gain requirements as those of WiFi, thus requiring discrete antenna solutions for the two subsystems. The RFID antenna may require operation in the target frequency, 860-960 MHz for passive UHF. Based on FCC requirements and allowances, the interrogator may be allowed to source up to 1 W of power into the antenna and allow the antenna to have gain such that the output of the antenna may be up to 4 W EIRP. In order to accomplish this, while also minimizing the size of the antenna to achieve the goals of the product, the use of a dielectric material between the patch and the ground plane other than air may be necessary. Additionally, in this embodiment of the present disclosure, a circularly polarized monostatic antenna may be used to offer the best chance to read tags when the tag orientation relative to the antenna cannot be guaranteed.

The WiFi antennas in this device may be used with the WiFi subsystem to provide the communications channel between the device and the WiFi access points. In this embodiment, two antennas may be used for both spatial diversity and operation over the two different frequencies (2.4 Ghz and 5 Ghz) that are currently specified in the IEEE 802.11 standards. There are several options for WiFi antenna construction including chip or trace antennas directly on the circuit board, wire antennas that connect to the circuit board but are physically mounted elsewhere in the enclosure, custom circuit board antennas that are a combination of the previous solutions and are typically purchased as a component, and then external dipole antennas that typically mount outside of the unit and connect using one of the standard connector types.

The design of the enclosure of the disclosed device may be important to the successful deployment and operation. The critical factors may include the thermal dissipation capacity, the RF transparency with respect to the WiFi and RFID antennas, the protective abilities from physical and RF reflection perspectives.

The ability to mount the device when it is not connected to the AC outlet (which provides the mounting solution for that deployment scenario) may be considered in the design of the enclosure. In the exemplary embodiment, the back of the enclosure may have a set of three screw holes designed to receive screws through a mounting plate. The mounting plate may be designed such at it can connect to one or more brackets attached securely to the wall. These brackets can be designed to support flush mounting, or angled mounting in either one fully adjustable bracket or as a collection of brackets designed for specific purposes.

Figure 2:
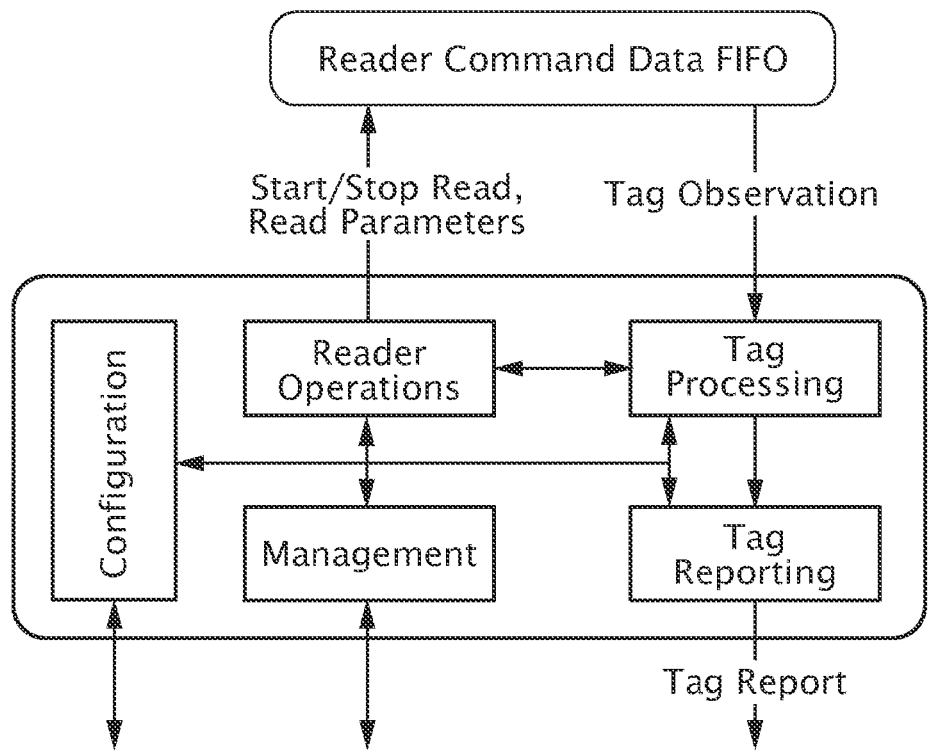
FIG. 2 is a diagrammatic representation of an exemplary software architecture, within which an embodiment of the present disclosure may be implemented.

FIG. 2 illustrates software functional blocks that may run in the Host CPU of the reader. The software is typically responsible for providing the overall control of the system which includes, but is not limited to, controlling the RFID reader operation, processing tag information from the RFID subsystem, managing the overall system configuration, using the networking components to report data to external systems, processing and sending user interface inputs and outputs to both physical and software-based interfaces, managing the input and output of certain debugging information, and reading and writing information to and from the memory.

In FIG. 2, the Configuration block may contain the configuration for reader operations, tag processing, tag reporting and management blocks. In an exemplary embodiment, the configuration of the reader may be updated from an external system using a wired or wireless communication interface using web-services. In an alternative embodiment, the configuration of the reader may be updated from an external system using a configuration file transmitted over wired or wireless communication interface. In yet alternative embodiment, the configuration of the reader may be updated by logging into the reader and via the command-line interface.

The Reader operations block may execute algorithms that control the low-level operations of the reader. It may include control of when the reader starts and stops reading. In addition, it may include the RF configuration and Gen2 air protocol configuration the reader shall use while reading. RF configuration may include transmit power and receive sensitivity Gen2 configuration may include the forward and reverse RF link parameters and singulation parameters. The commands from the reader operations block may be sent to the RFID subsystem. Receiver sensitivity is a measure of the weakest tag signal an RFID reader is able to detect and demodulate. Changing this affects the minimum detectable signal (MDS) so as to prevent weaker responses from tying up the receiver. The other commonly used term for such a control is squelch.

The reader can operate in plurality of modes. Each mode may define the overall operational parameters for the reader. One of the modes may be designated as the default mode— this is the mode that the reader may use upon startup. The Reader operations block may set the operational parameters based on the current mode. As part of the configuration, a set of mode switching events may be defined that may be used to determine when the reader switches from one mode to the other. For example, an operational mode could be such that the reader operates at low transmit power and low duty cycle. Another exemplary operational mode may be full transmit power and full duty cycle.

The Tag Processing block may comprise a Tag Record sub-block and a Logic Processing sub-block. Each tag read by the RFID subsystem may be received by the Tag Processing block in the form of <Tag ID, timestamp, RSSI>, where, Tag ID may be the tag identifier (in an exemplary embodiment, it is encoded in hexadecimal format), the timestamp at which the tag was observed by the RFID sub-system, the RSSI (receive signal strength indicator) of the tag observation. The Tag Processing block may maintain in the Tag Record sub-block a separate list of observations specific to each Tag ID, and the entries in this list may be sorted in the order of receipt from the RFID sub-system. Upon receiving a new tag observation, a new entry corresponding to that tag observation may be added to the list corresponding to the tag ID if there is already one for the said tag ID, else, a new list may be created and this entry may be added as the first entry to that list. The Logic Processing sub-block may compute the confidence and RSSI statistics for the tag based on the observations stored in the Tag Record sub-block. These statistics may be stored as part of the tag's data in the Tag Record sub-block.

The Tag Reporting block may be responsible in determining when to generate a report, which tags to include in the report, and then ultimately transmitting the report to an external system. The report can contain information of multiplicity of tags. In an exemplary embodiment, the report may be sent over LLRP protocol to the external system.

The Management block may be responsible for managing the networking, monitoring, logging and debugging functionalities. This block may be responsible for managing the wired and wireless network configuration and connectivity, and synchronizing time with a network time server. The block may also be responsible for maintaining statistics and generating alerts. In an exemplary embodiment, the management data, alerts and statistics may be communicated to an external system over SNMP (Simple Network Management Protocol), the time synchronization may be done using NTP (Network Time Protocol). It is through this block that a user of the system can access logs and debug the system.

DETAILED DESCRIPTION OF EXEMPLARY EMBODIMENTS

The present disclosure describes components as shown in FIG. 1. The designed purpose of the physical and electrical design of these components, as well as the design and implementation of the software running in the system, is to achieve the goal of high performance from the each of the subsystems individually and as a full system, while allowing for a multiplicity of options that simplify the installation and deployment process.

The RFID reader of the invention supports power input options of DC power as supplied by either an external AC/DC converter and/or Power over Ethernet (PoE) which uses the network interface to supply DC power as well as network connectivity. It also supports PoE for power and not for network connectivity. By supporting an AC input for power in addition to one or more options for DC power input, the complexity of deployment of the disclosed device may be greatly reduced. When powered by AC directly from an AC outlet, no additional wires, AC/DC conversion, or mounting systems are necessary (when networking is provided through a wireless mechanism such as WiFi).

Figure 3:
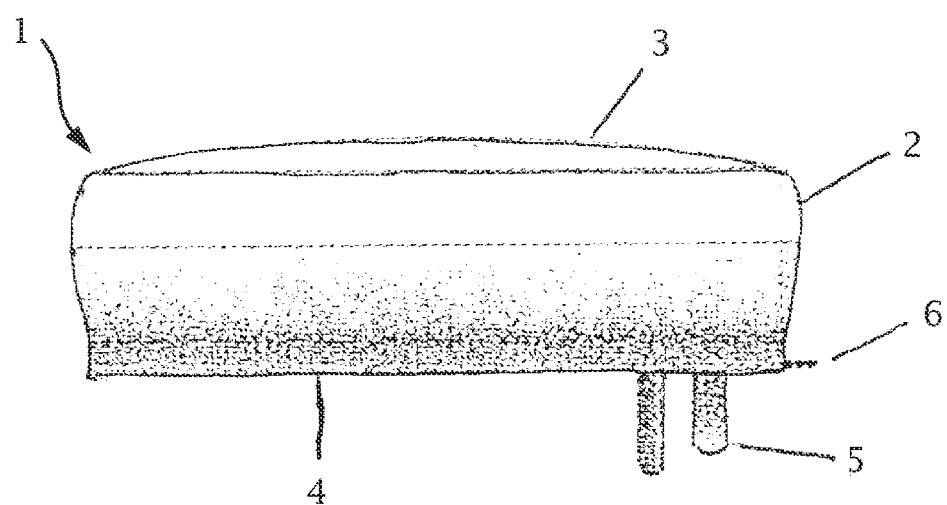
FIG. 3 is a side view of the interrogator showing the readiness to be mounted directly to a power outlet.

FIG. 3 illustrates the side view of an RFID interrogator 1 able to be powered and mounted from the AC plug with no additional mounting hardware, power inputs, or network connectivity. The interrogator has a housing 2 that is in the shape of a dome. The interrogator 1 has a dome cover 3 and a substantially planar back surface 4 for mounting against a flat surface. Plug pins 5 protrude from the back surface 4 but are removable or collapsible into a recessed portion of the back surface 4. A mounting bracket 6 may be attached to the back surface for mounting the interrogator to a wall, ceiling or other surface.

When a system is designed to have AC as well as DC power inputs, an internal AC/DC converter may be necessary to transform the AC voltage(s) and current(s) into the system target DC voltage(s) and current(s). The AC/DC converter can potentially be designed to support a small input voltage range, such as exists in a single country or region, or the AC/DC converter can be designed for operation over a wider range of AC input voltages such as exist throughout the world. In either case, the DC voltage and current (range) is typically specific to the internal DC power input requirements of the components of the system. The resulting DC power supply from the AC/DC conversion may then be combined with the other DC inputs, in this case from the PoE and external AC/DC conversion, is such a way, with diodes and/or other protective electronic devices, that it is possible for more than one of the power supply options to be connected to live power sources and still provide the right amount of power to the internal components.

It is possible that the design of the system will require a connection to an earth ground for safety reasons. If this is case, as it is in the disclosed embodiment, it can be observed that installations of the AC outlets result in two orientations of earth ground, one with the ground plug above the hot and neutral spades, and the other with the ground plug below the spades. This results from a number of reasons, and it can exist in any location around the world where the orientation of the plug is not symmetric from top to bottom. In such instances, in order for the device to maintain the same orientation regardless of the orientation of the plug socket, a mechanism for reversing the pins/spades 5 on the plug is required. In the present disclosure, the plug 7 is designed to be removed and reversed in orientation, as shown in FIG. 4.

Figure 4:
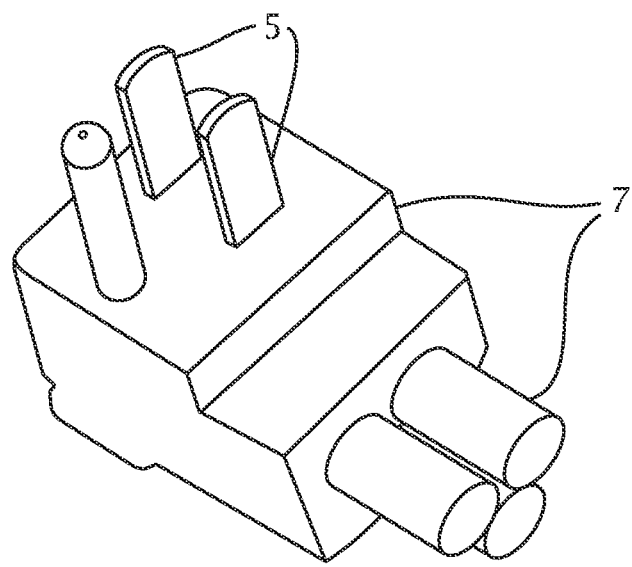
FIG. 4 is one embodiment of a removable plug.
Figure 5:
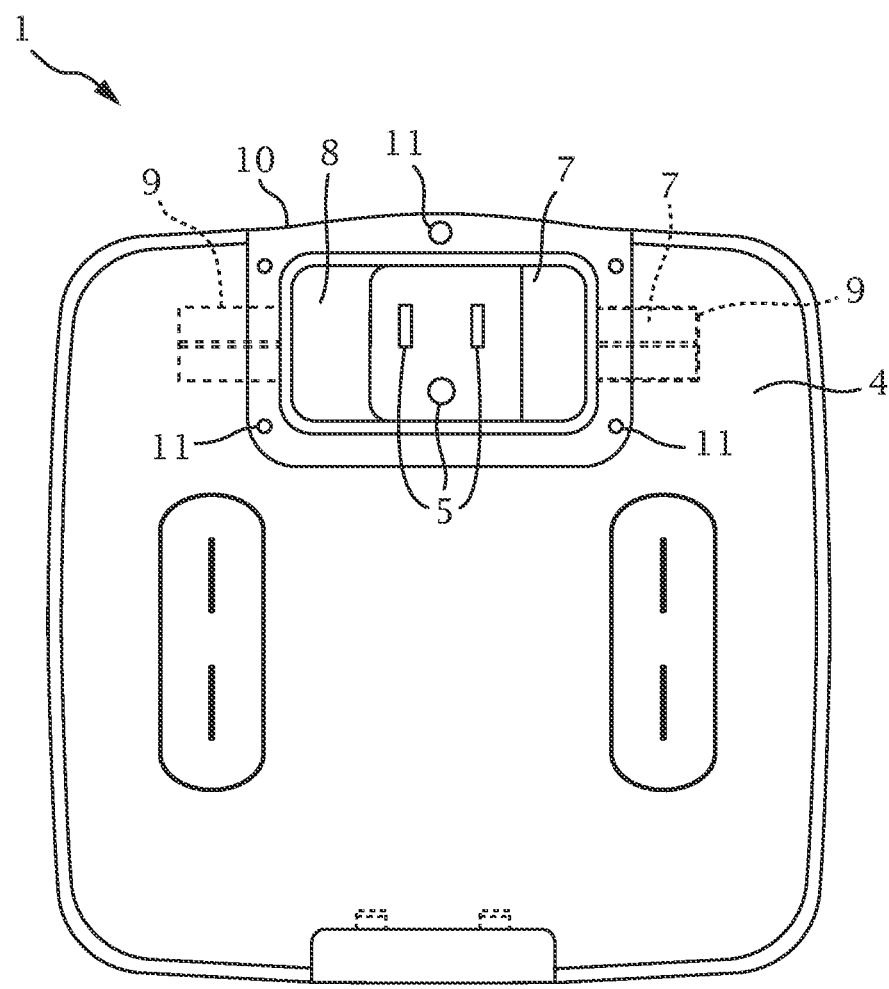
FIG. 5 is a back view of the interrogator showing the reversible plug socket.

In this embodiment, the plug has the regional standard pin and spade configuration (FIG. 4 shows it for North America, but the concept is the same regardless of locale) and a standard IEC C5 plug for connection to one of two sockets in the device. The C5 plug 7 and socket is chosen for this embodiment, but other embodiments might choose other plug and socket formats, including those that do not conform to existing standards. There are two sockets 9 opposite each other in a recess 8 that will fit the plug such that the unit is flush with the wall when the plug is connected and the unit is plugged into the AC socket. The two opposite sockets 9 allow for the plug assembly 7 to be removed, rotated 180 degrees, and then reconnected to the opposing plug to reverse the orientation of the ground plug relative to the spades 5 (aka pins). The opposing IEC C5 sockets in the exemplary implementation are shown in FIG. 5.

In embodiments that do not require an earth ground for safety, a reversible prong plug may still be required if a polarized plug (one spade larger than the other) is used for the same reasons that a reversible grounded plug is necessary. If the system has components that are constructed in such a way, or if product requirements are such, that two unpolarized, symmetric spades are sufficient for connectivity to the AC outlet, then a reversible plug as defined in this system may not be necessary.

Whether a plug requires reversibility or not as defined by implementation, product, and safety requirements, the mechanism disclosed that provides reversibility also provides removability. Removability is a characteristic of the present disclosure that allows for mounting of the system flush with walls when the system is powered from one of the mechanisms defined that do not allow for the AC plug to be inserted into a socket. The act of inserting the AC plug into a socket allows the device to mount flush with a wall, so if flush mounting is desired for a system which is powered either by AC or DC, a mechanism for either removing the AC plug or manipulating it or its components such that it can be made flush with the unit and therefore the wall is required.

Although it is possible that the device is supported in the installation by the AC plug itself, the present disclosure discusses a mechanism for securing the device to AC outlets that have a center screw. The center screw can be removed, the device inserted into the outlet, and then the screw reinstalled. The component of the housing that has the hole for screw insertion is designed to accommodate the different types and installation variations of AC outlets commonly found. The exemplary implementation is made from thin metal that can flex slightly to draw the device toward the hole when the screw is tightened, while also deforming slightly when necessary.

Figure 9:
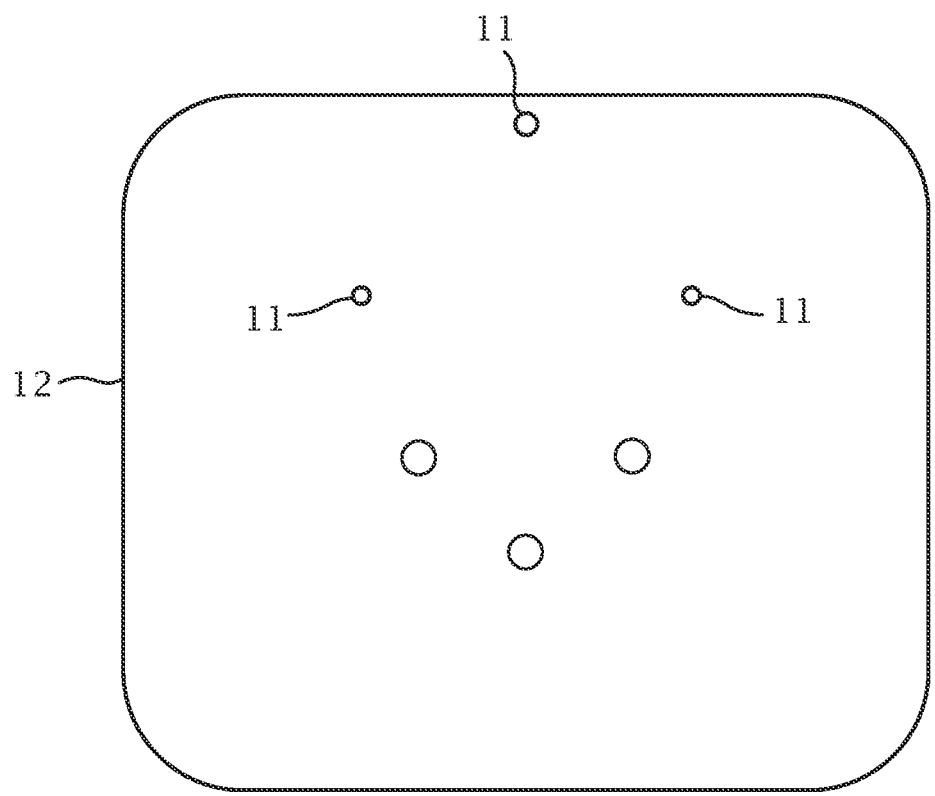
FIG. 9 is a top view of a bracket.

In installations that utilize DC power and, as such, are not using the AC outlet for mounting, a mechanism for mounting to a wall or ceiling may be required. Providing mounting solutions directly using the housing of the device might not meet the size goals of the unit so an external mounting mechanism is disclosed that enables the unit to be mounted in a wall or ceiling, at any desired angle, without increasing the base thickness of the unit. This mounting system consists of some number of screw holes 11 in the back of the base unit (three in the exemplary implementation) that can support a metal or plastic plate 10, FIG. 5. The plate is designed to mate with a bracket 12 as shown in FIG. 9 that can be designed to meet any mounting requirements for the device, including flush, angled down, angled sideways, or even partially or fully adjustable. In the simplest example, the mounting bracket is flat except for the required mating mechanism. The mounting bracket has screw holes 11 that are complimentary to the screw holes 11 in the back surface 4 of the interrogator 1. This allows the device to be as close to the wall as possible. Another example is a mounting bracket that has a flat contact with the wall, but then an angled surface to mate with the mounting plate so that the interrogator can be mounted near the ceiling but still focus the read zone angled downwards where the tags may be most likely to be.

The housing is critical to the successful operation of the device. It provides the structural support for the components, heat dissipation for the electronics, opacity for the WiFi and RFID antennas, and physical "keep-out" enforcement for the components that require them. All of these functional requirements need to be achieved in a package small enough and light enough to be stable when deployed using AC power from an AC outlet. In the exemplary implementation, the rear of the device is metal with cast fins running vertically the length of the device to provide as much air contact as possible. The front of the housing is ABS (Acrylonitrile Butadiene Styrene) plastic. The dome is constructed to meet the size requirements for plugging into a typical AC outlet, while also having a curved shape to minimize forces on the unit in the event of a bump from a passing object in a hallway or a room. In addition, the geometry of the dome is also designed to provide enough separation from the RFID antenna such that the worst case reflected power from an obstacle placed directly in front of the antenna would be below the maximum reflected power for the RFID receive path. In this exemplary embodiment, the front of the dome is engineered to provide 10 mm spacing between the front of the antenna and the closest possible object directly in front of the device.

The RFID subsystem of the disclosed device is optimized for maximum reader sensitivity in order to achieve the maximum readability regardless of the position of the reader based on the availability of AC outlets when that is the power source. There is often more opportunity for optimal interrogator positioning with PoE or DC inputs because of the flexibility in the cable, but this device is designed for the least flexible situation. In all of the powering options, maximizing the RFID receive path sensitivity is a critical factor in achieving the longest read range possible, particularly with a class of tags know as battery assisted passive. For these tags, optimizing the receive path allows tags that are not limited by the ability to power them solely by the incident RF field can be "heard" by the reader at a longer distance.

Figure 6:
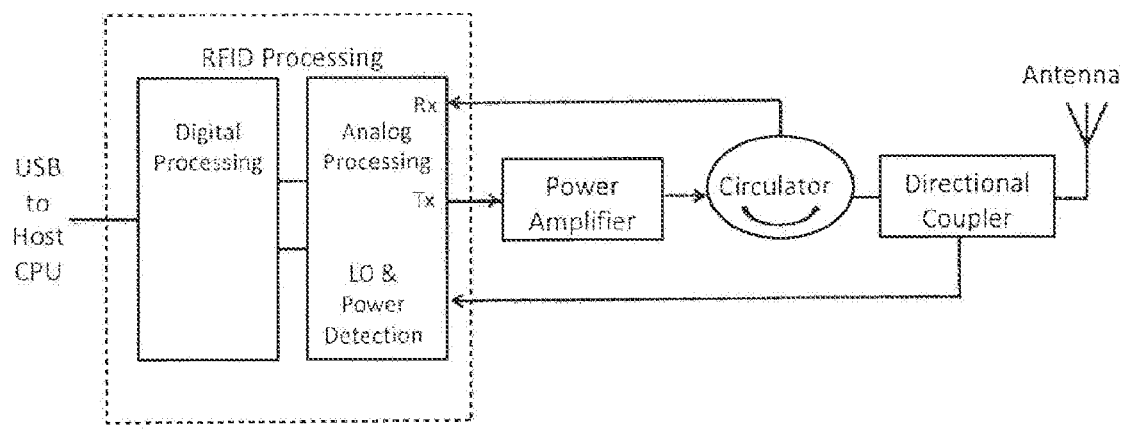
FIG. 6 is a diagrammatic representation of an exemplary RFID sub-system, within which an embodiment of the present disclosure may be implemented.

FIG. 6 provides an example of an exemplary implementation of the RFID subsystem. In FIG. 6, the logical separation of the RFID Processing between the Digital and the Analog processing illustrates that the RFID is fundamentally sending and receiving analog signals, but yet much of the processing, including the air protocol, power management, and system control is performed with digital logic. The separation and necessary conversion is therefore performed through proprietary digital-to-analog and analog-to-digital between the two logic functions. In the exemplary implementation, the RFID Processing subsystem corresponding to the functions illustrated in FIG. 6 is provided by two chips, one a general purpose MCU and a custom RFID IC. The RFID IC contains the A/D D/A conversion and does the analog processing along with some digital processing. Therefore, while the architectural split as illustrated in FIG. 6 does exist, it does not correspond exactly with the physical implementation in the two chips, in one example implementation. In an exemplary embodiment, the RFID IC is an Impinj R2000 chip.

The RFID receive path optimization consists of minimizing losses in the path from the antenna to the Rx input of the RFID Processing function by removing all sources of attenuation and using the physical characteristics of the antenna design and front dome spacing to ensure that the worst case receive path input, which would full reflection of the output signal from an RF-reflective object placed against the dome of the device, would not result in a larger input signal than could be handled by analog input of the Rx input. Other optimizations include utilizing a circulator for the switching of the Tx output to the antenna and the input back to the Rx port and ensuring that all signals are matched and balanced based on the characteristics of the single integrated antenna. This matching is possible because there is no external antenna port in the exemplary implementation, but other implementations could provide such optimizations based on characteristics of one or more supported antennas.

FIG. 6 illustrates the additional components that are important for proper operation including the external power amplifier that provides the additional 10 dB or more of power beyond what the RFID IC delivers in order to achieve the maximum 1 W output to the antenna. The circulator and directional couplers provide the signal direction and splitting as necessary to provide the return path for the signals from the antenna as well as the feedback input to the RFID IC to the Local Oscillator (LO) and Power Detection functions. Not shown in FIG. 6 are the necessary passive components that provide the necessary digital terminations, matching, and balancing for the (ultra) high frequency signals. These must be provided to match the specifics of any implementation.

The RFID antenna is designed specifically to achieve the maximum gain of 6 dBi allowed in the target application. The challenge with this antenna is to achieve the gain in a monostatic antenna at roughly ¼ wavelength with materials and process that allows for a commercially viable component for the RFID interrogator. This goal is achieved in the disclosed device using FR-4, the woven glass and epoxy material commonly used for circuit boards, between the patch and ground plane. This yielded an antenna that is small enough (120 mm square) to create a device that can be plugged into AC outlets, while still achieving the performance and cost goals of the completed system. The smaller size of the antenna results in a wider 3 dB beamwidth than larger antennas, roughly 110° in the exemplary implementation, as compared to roughly 60° in larger antennas.

The ability to communicate with external systems, either for management purposes or RFID tag information delivery is enabled through a multiplicity of mechanisms. In the exemplary embodiment, Ethernet and WiFi are supported. Additional communication mechanisms such as, but not limited to, Zigbee, Bluetooth, and cellular telephone could be employed for this communication. Communicating using Ethernet necessarily requires a physical connection to the device from standard Ethernet switching infrastructure. As discussed previously, this Ethernet infrastructure might also provide the power to the device when a PoE switch is used. Ethernet requires very little management in order for the device to establish connectivity from the physical, Internet Protocol (IP), and application layers above, and it is the default operation expected of current wired networking devices.

Wireless networking connectivity using WiFi requires more initial setup, primarily for the security protocols, but it is likely to be the lowest cost for deployment because it does not require the installation of wires. Because WiFi is used by so many devices owned by so many people, most of who are not authorized to join a particular enterprises network, the security setup for WiFi is significant. The parameters include the communication channel, the type of authentication, and the authentication information itself. With this information, an authorized device can typically establish connectivity to a WiFi access point and begin communications with the rest of the network.

Software Algorithms

Operating Modes

The reader can operate in plurality of modes. Each mode defines the overall operational parameters for the reader. One of the modes is designated as the default mode—this is the mode that the reader uses upon startup.

Based on the configured mode switching event, the reader switches from one mode to the other. The event can be a message from an external system received by the reader on one of the communication interfaces—wired or wireless; or, it can be an internal event generated by the reader's processing block based on one or more combination of a plurality of measurements. Examples include RSSI of tags crossing a threshold, reflected signal strength received from the antenna crossing a threshold, detection of a RFID tag by the RFID sub-system, signal strength of another reader's transmission as measured at its receiver crossing a threshold, absence of any RFID reads for a configured period of time, no change in the set of tags read by the reader for a configured period of time, and other possible events due to lack or presence of RFID reads or measured signals and interference in the environment.

Configuration

The reader configuration may comprise:

Its own IP address, netmask, default gateway, and DNS servers, or the configuration that the reader should learn these parameters dynamically via DHCP.

Wireless network parameters: SSID and the security credentials.

Network parameters: NTP server IP address, SNMP manager IP address.

System parameters: The reader communicates with one or more servers or middleware for which the reader maintains the hostnames or IP addresses and ports used for those servers. In an exemplary embodiment, the reader transmits the tag reports to the server over LLRP protocol using TCP port 5084.

For each operating mode there are the following elements:
    Default mode: This is a Bolean field—if set to True, then the said mode is the default mode.
    Duty cycle: Time duration for which the reader is turned ON: $t_{on}$; Time duration for which the reader is turned OFF: $t_{off}$. A read cycle is defined as the time duration $t_{on}+t_{off}$.
    Transmit Power.
    Gen2 configuration parameters:
        Forward link parameters.
        Reverse link parameters.
        Select filter settings.
        Singulation parameters.
        For details on the above parameters, please refer to LLRP protocol specification.
    Tag filtering and reporting: List of tag filters and their reporting interval. This configuration specifies for each tag filter pattern how frequently it needs to be reported to the backend server. The tag filter pattern could be a binary bit pattern representation including significant bits and "don't care" bits, full tag specification, or even by higher level encoding such as by the type of asset represented by the tag. The reporting interval may or may not be aligned with the read cycle timing boundaries. In an exemplary embodiment, the reporting interval is aligned with read cycle timing boundaries. In an alternative embodiment, the reporting interval is asynchronous to read cycle timing boundaries.
    For tags that should not get reported, a reporting interval of zero is set.

Mode switching criteria: For each pair of defined modes ($M_a$, $M_b$), this defines the event upon which the reader will switch from mode $M_a$ to $M_b$ and vice-versa. It is defined as a tuple <$M_a$, $M_b$, SwitchingEvent>.

TagReportContent: This configuration parameter specifies the contents of the tag report. This setting will be applied for all tags observed and reported by the reader.

PerReadCycleData: This is a Bolean field—if set to True, per read cycle data gets reported. If set to False, the summarized data gets reported.
    InclPeakRSSI? This is a Bolean field—if set to True, Peak RSSI gets reported.
    InclCOVRSSI? This is a Bolean field—if set to True, COV of the RSSI gets reported. COV is coefficient of variance.
    The confidence statistics are always part of the report—the PerReadCycleData parameter determines if it is summarized or per-read cycle.

TagReportingDelta: This configuration parameter specifies the delta (i.e., difference) between the current measurement and the last reported measurement that is deemed significant enough to be reportable. If the current measurement is within delta units of the last reported measurement, the reader will suppress reporting this new data over the backend link. This configuration setting is applied to all tags observed and reported by the reader. The delta evaluation is on per-tagID basis. In an exemplary embodiment, following elements are part of this parameter:

Delta Configuration Elements:
    ConfidenceDeltaThresh: This is the minimum delta value between the last reported value and the current value of the Confidence required for deeming the new measurement of Confidence to be significant and reportable.
    PeakRSSlDeltaThresh: This is the minimum delta value between the last reported value and the current value of the Peak RSSI required for deeming the new measurement of PeakRSSI to be significant and reportable.
    CoVRSSIDeltaThresh: This is the minimum delta value between the last reported value and the current value of the CoV(RSSI) required for deeming the new measurement of CoVRSSI to be significant and reportable.
    SuppressionCriteria: This defines the criteria for suppressing the reporting. The possible values for this parameter are Strict and Relaxed.
        Strict: Delta criteria for all the above elements (Confidence, Peak RSSI, CoVRSSI) has to be satisfied, else the reporting of the new data gets suppressed.
        Relaxed: Delta criteria for at least one of the above elements has to be satisfied, else the reporting of the new data gets suppressed.
    If one of the Delta configuration elements is set to zero, then the delta for that said measurement is not considered for report suppression criteria.
    MaxReportingInterval: This parameter specifies the maximum time that must pass since the last tag report sent for any tag by the reader by which a new report needs to be sent, regardless of whether the TagReportingDelta constraint(s) have been met. If this parameter is set to zero, then there is no maximum time requirement. The MaxReportingInterval may or may not be aligned with the read cycle timing boundaries. In an exemplary embodiment, the MaxReportingInterval is aligned with read cycle timing boundaries. In an alternative embodiment, the MaxReportingInterval is asynchronous to read cycle timing boundaries.

Confidence computation parameter: This parameter specifies how the confidence of a tag is computed. Reader confidence of a tag is basically the probability that the tag is actually in the field of view of the reader, rather than just being read sporadically. Note that confidence can and will decrease as well as increase. A confidence at or approaching zero can be a valid result of the confidence calculation.

In an exemplary embodiment the confidence of a tag is computed at the end of each read cycle and is a function of the number of times the tag was seen during that read cycle. The function is represented as a TagSeenCount-to-Confidence table which is the input configuration. Each entry of the table is a tuple <TagFilter, Tag Seen Count, Confidence>—i.e., for the same tag seen count, 2 different tags may result in a different confidence value. This configuration table is used for all tags observed and reported by the reader.

In another embodiment the confidence of a tag is computed upon each tag observation and is a function $\Omega(\delta)$ of the low-pass-filter value ($\delta$) of the time interval between successive observations of that tag, and the tag filter. For such a scheme, the function then becomes the input configuration. This configuration function is used for all tags observed and reported by the reader.

Tag Aging: This parameter specifies when stale entries can be purged from the Tag Record memory. When all entries for a tag are removed from the Tag Record memory, entries for the tag in the PreviouslyTransmittedReports memory are also purged.

Figure 7:
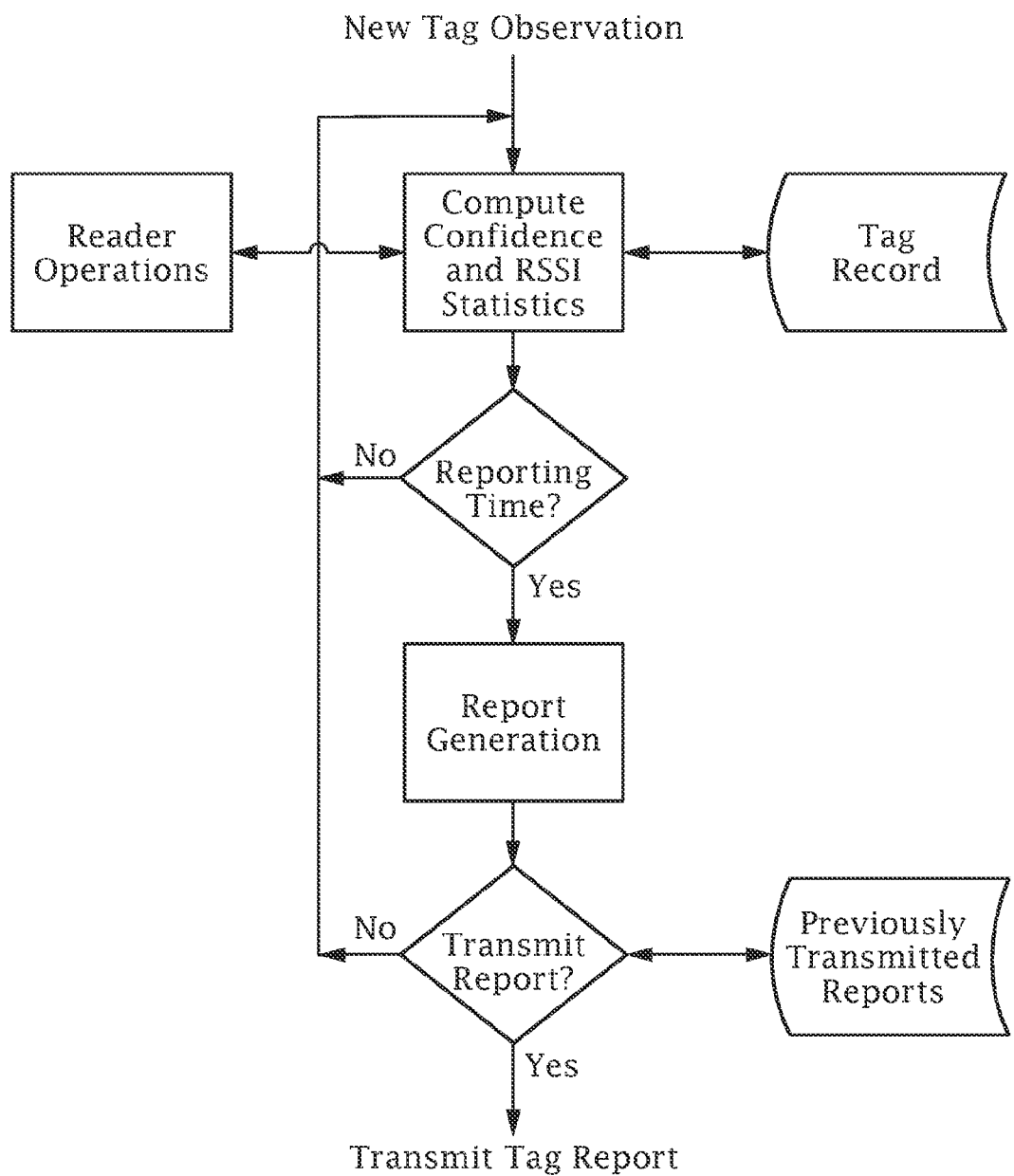
FIG. 7 is a flowchart for the tag processing and reporting logic in the interrogator.

The processing logic block receives new tag observations from the RFID sub-system. For each new tag observation, the processing logic block executes the logic illustrated by the flowchart in FIG. 7.

Example

Figure 8:
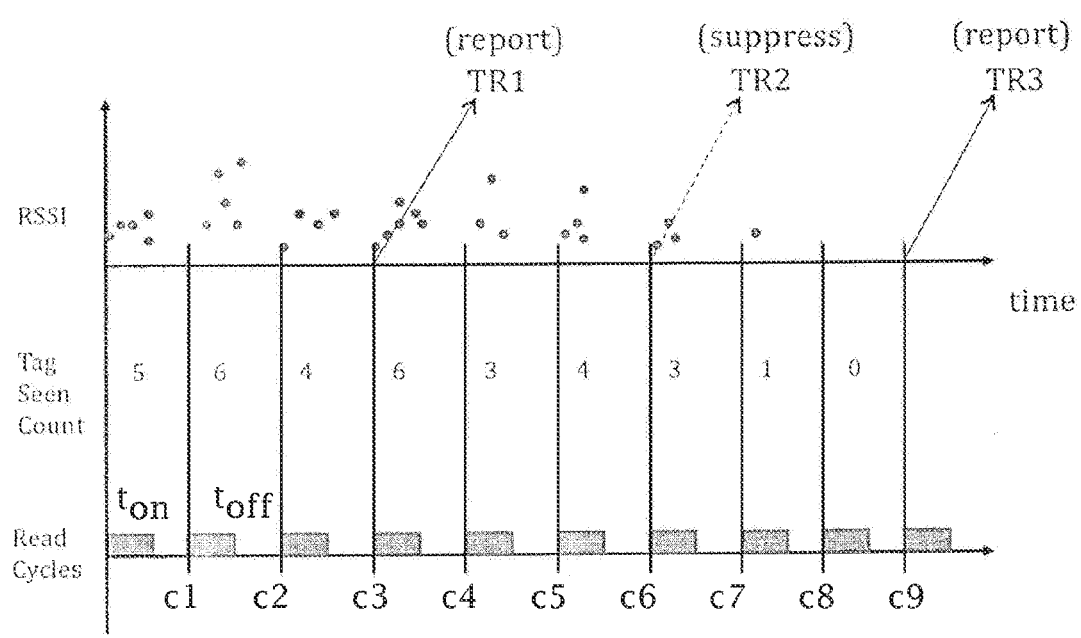
FIG. 8 illustrates an example operation of the reader.

FIG. 8 illustrates an example operation of the reader. The figure shows the reads of a single tag, lets say T. The read cycles are shown with an ON time of $t_{on}$ and OFF time of $t_{off}$. In this example, the read cycles are numbered c1-c9. During the ON time, the reader reads the tag T several times during each read cycle; each tag observation is noted as a dot, and y axis for the dot location is the value of the RSSI as measured by the RFID sub-system for that observation. The number of times a tag is seen during a read cycle is captured as the tag seen count. For example, the tag was seen 5 times in read cycle c1. This tag T has a tag reporting interval of 3 read cycles. So, at the end of read cycle c3, the reader will report the new statistics pertaining to the tag if it is determined to be a significantly different from the last report transmitted for that tag or the last report sent by the reader was longer than MaxReportingInterval ago. In this example, the reader determined that data in TR1 was significantly different from the last report sent for the tag and hence transmitted TR1. However, the data in TR2 was determined to be not significantly different than TR1 and hence got suppressed.

Statistics Generation

Each tag observation transmitted by the RFID sub-system and received by the logic processing block at a minimum comprises of tag ID, timestamp of the latest tag observation, RSSI of the tag observation as measured by the RFID sub-system. In an alternative embodiment, a tag observation can comprise of additional elements like bit-level RSSI statistics for the tag observation, Gen2 query round statistics (collision slots, empty slots).

The processing logic block maintains a Tag Record memory which stores the tag observations sorted in causally ordered list and arranged and accessible per-tag ID.

The received tag observation is first stored in the Tag Record memory block. The next step is to compute the current value of the confidence and RSSI statistics for the tag.

In an exemplary embodiment, the Reader Operations signals the read cycle start/stop events (e.g., <c15, start> or <c15, stop>, where c15 is a read cycle count that Reader Operations block maintains and increments with each new read cycle) to the processing logic block. The processing logic block upon receiving the read stop event for read cycle RC, after a configurable short delay, accesses the Tag Record memory and retrieves the tags that were observed in the read cycle RC (i.e., in the time interval between cycle RC start time to cycle RC stop time). For each tag T in that set, count the number of times that tag T was seen by the reader—that becomes the TagSeenCount(T). The TagSeenCount-to-Confidence table is then used to determine the confidence for the tag T for RC, Confidence(T, RC).

When computing the confidence for tag T, the RSSI statistics for tag T for the read cycle RC is computed as follows:

SetRC(RSSI): This is the set of RSSIs of the tag observations of the tag T in the read cycle RC.

PeakRSSI(T, RC): This is the Maximum RSSI value amongst the RSSIs in SetRC(RSSI).

StandardDeviation(SetRC(RSSI)): This is the standard deviation of the RSSIs in SetRC(RSSI).

Average(SetRC(RSSI)): This is the average of the RSSIs in SetRC(RSSI).

CoVRSSI(T,RC): This is computed as the ratio of StandardDeviation(SetRC(RSSI)) and Average(SetRC(RSSI).

Report Generation

Once the confidence and RSSI statistics have been generated, the confidence and RSSI statistics for that read cycle is stored in a buffer as <RC, Confidence(T, RC), Peak(T, RC), CoVRSSI(T, RC)> and an evaluation is made on whether it is time to report tags over the backend link. This depends on the tag ID, and the configured reporting interval for the tag. If the reporting interval for a tag T has expired, then that tag becomes a candidate for reporting. All such tags that are scheduled to be reported are collected—let this set of tags be called ReportableTags. If the set is empty, the processing logic block checks if MaxReportingInterval amount of time has elapsed since any report was sent to the reader. If the check result is True, then an empty report TransmitReport (as defined in a later section below) is transmitted to the server. If the check result is False, the processing logic block goes back to waiting for a new tag observation. Let the set of read cycle numbers in the current reporting interval $TR_j(T)$ for a tag T be $RCSet(T, TR_j(T))$). For example, in FIG. 8, RCSet for the tag is {c5, c6, c7} for TR2 reporting interval.

For each tag in ReportableTags set, the current report for that tag is first generated. The report contents depend on the TagReportContent configuration parameter setting. For simplicity, let us assume that InclPeakRSSI and InclCOVRSSI are set to True, which means the report will contain the values of PeakRSSI and CoVRSSI.

If PerReadCycleData is set to True, the TagReportPerReadCycle(T, TR$_j$(T)) for each tag T in set ReportableTags contains:

```
TagReportPerReadCycle(T, TR_j(T)) =
<
  TagID T
  For each RC k in the RCSet(T, TR_j(T)):
    <k, Confidence(T, k), PeakRSSI(T, k), CoVRSSI(T, k)>
>
```

If PerReadCycleData is set to False, we first combine the statistics for tag T across the read cycles in RCSet(T):

PeakRSSI(T)=Maximum across PeakRSSI(T, k) for all read cycles k in RCSet(T, TR$_j$(T)).

CoVRSSI(T)=Maximum across CoVRSSI(T, k) for all read cycles k in RCSet(T, TR$_j$(T)).

Confidence(T)=Average across Confidence(T,k) for all read cycles k in RCSet(T, TR$_j$(T)).

Then, the TagReportSummarized(T, TR$_j$(T)) for each tag T in set ReportableTags contains:

```
TagReportSummarized(T, TR_j(T)) =
<
  TagID T
  <Confidence(T), PeakRSSI(T), CoVRSSI(T)>
>
```

In an alternative embodiment, the summarization could use a different statistics to combine the values of PeakRSSI or CoVRSSI or Confidence across multiple read cycles, such as average, maximum, minimum, variance etc.

Suppression of Non-Significant Information

Once a tag report (be it summarized or per read cycle) is generated for each tag in ReportableTags set, the next step is to determine if the new report contains significantly new information regarding tag readability when compared to the last report that was transmitted over the backend link for that tag. The last report that was transmitted for tag T if present is TagReport(T, TR$_k$(T)) and is stored in PreviouslyTransmittedReports memory, where TR$_k$(T) is the reporting interval when the last report for tag T was transmitted. It should be noted that k≤j−1 where j is the current reporting interval for the tag, because the reporting for (j−1)-th reporting interval may have been suppressed for the tag.

For a tag in ReportableTags set, if there is no previously transmitted report in PreviouslyTransmittedReports, the tag is automatically added to the set TransmitReportTags. The set of tags in TransmitReportTags are the ones whose tag reports are to be transmitted in this reporting cycle. For each of the other tags in ReportableTags set, T, the following logic is executed for delta comparison.

If PerReadCycleData is True,
  The data value for the last read cycle in the TagReport(T, TR$_k$(T)) is ConfidenceOld (T), PeakRSSIOld (T), CoVRSSIOld (T).
  The data value for the first read cycle in TagReportPerReadCycle(T, TR$_j$(T) is ConfidenceNew (T), PeakRSSINew (T), CoVRSSINew (T).

If PerReadCycleData is False,
  The data value in the TagReport(T, TR$_k$(T)) is ConfidenceOld (T), PeakRSSIOld (T), CoVRSSIOld (T).
  The data value in the TagReportSummarized(T, TR$_j$(T) is ConfidenceNew (T), PeakRSSINew (T), CoVRSSINew (T).

```
ConfidenceDelta (T) = | ConfidenceNew (T) − ConfidenceOld (T) |
PeakRSSIDelta (T)   = | PeakRSSINew (T) − PeakRSSIOld (T) |
CoVRSSIDelta (T)    = | CoVRSSINew (T) − CoVRSSIOld (T) |
```

Whether the current report for tag T gets suppressed depends on the SuppressionCriteria configuration parameter value: Strict or Relaxed, as explained in the Configuration section above.

If SuppressionCriteria=Strict, and (((ConfidenceDelta(T)≥ConfidenceDeltaThresh) and (PeakRSSIDelta(T)≥PeakRSSIDeltaThresh) and (CoVRSSIDelta(T)≥CoVRSSIDeltaThresh))=True), then the transmission of the current report for tag T is not suppressed. The tag T gets added to set TransmitReportTags.

If SuppressionCriteria=Relaxed, and (((ConfidenceDelta(T)≥ConfidenceDeltaThresh) or (PeakRSSIDelta(T)≥PeakRSSIDeltaThresh) or (CoVRSSIDelta(T)≥CoVRSSIDeltaThresh))=True), then the transmission of the current report for tag T is not suppressed. The tag T gets added to set TransmitReportTags.

The next step is to transmit the TagReport for the tags in the set TransmitReportTags over the backend link. Depending on the PerReadCycleData value, the transmitted report contains the following:

If PerReadCycleData is set to True, the TransmitReport( ) contains:

```
TransmitReport( ) =
<
  Current Timestamp
  For each tag T in the set TransmitReportTags:
    TagReportPerReadCycle(T, TR_j(T))
>
```

If PerReadCycleData is set to False, the TransmitReport( ) contains:

```
TransmitReport( ) =
<
  Current Timestamp
  For each tag T in the set TransmitReportTags:
    TagReportSummarized(T, TR_j(T))
>
```

If the TransmitReportTags is an empty set, and MaxReportingTime amount of time has not elapsed since the last report transmission (for any tag) by the reader, no message is sent. If the TransmitReportTags is an empty set and MaxReportingTime amount of time has elapsed since the last report transmission (for any tag) by the reader, an empty report (with just the timestamp) is sent. If on the other hand, the TransmitReportTags is not an empty set, the report is sent up to the server.

Having now fully described the invention, it will be apparent to one of ordinary skill in the art that many changes and modifications can be made thereto without departing from the spirit or scope of the invention as set for the herein.

What is claimed is:

1. A system for reading Radio Frequency Identifier (RFID) tags, the system comprising:
   an enclosure comprising a dome-shaped front surface and a substantially flat back surface, wherein the substantially flat back surface comprises a recess and a plug which is collapsible into the recess;

at least one antenna within the enclosure and configured to receive one or more tag identifiers from one or more RFID tags, wherein the enclosure comprises a space between the dome-shaped front surface and the at least one antenna; and at least one processing unit housed within the enclosure and configured to, for each of one or more of the received one or more tag identifiers, record a tag observation comprising a tag identifier, a timestamp representing a time at which the tag identifier was received, and a signal strength at which the tag identifier was received, for each of a plurality of time intervals, for each of one or more tag filters, compute a confidence that RFID tags satisfying a tag filter were in a field of view of the at least one antenna during a time interval, wherein the confidence is computed based on one or more recorded tag observations which satisfy the tag filter and which occurred during the time interval, compute one or more statistics based on the signal strength of the one or more recorded tag observations which satisfy the tag filter and which occurred during the time interval, determine whether or not to transmit a report for the tag filter by, if a reporting interval for the tag filter has not expired, determine to not transmit the report for the tag filter, and, if the reporting interval for the tag filter has expired and if a difference between one or more of the confidence and the one or more statistics exceeds a threshold, determine to transmit the report for the tag filter, and, if it is determined to transmit the report for the tag filter, generate the report for the tag filter, and transmit one or more reports generated for one or more of the one or more tag filters to an external system via at least one network.

2. A system for reading Radio Frequency Identifier (RFID) tags, the system comprising:

an enclosure;

at least one antenna configured to receive one or more tag identifiers from one or more RFID tags; and at least one processing unit housed within the enclosure and configured to, for each of one or more of the received one or more tag identifiers, record a tag observation comprising a tag identifier, a timestamp representing a time at which the tag identifier was received, and a signal strength at which the tag identifier was received, for each of one or more time intervals, for each of one or more tag filters, identify one or more tag observations which satisfy a tag filter and which occurred during a time interval, and compute a confidence that RFID tags satisfying the tag filter were in a field of view of the at least one antenna during the time interval based on the identified one or more tag observations, generate one or more reports for one or more of the one or more tag filters using one or more computed confidences, and transmit the generated one or more reports to an external system via at least one network.

3. The system of claim 2, wherein the enclosure is configured to obtain power via a plurality of sources.

4. The system of claim 3, wherein the plurality of sources comprise two or more of an Alternating Current (AC) outlet, an external AC/Direct Current (DC) converter, and Power over Ethernet (PoE).

5. The system of claim 3, wherein the at least one antenna comprises a radiating patch, a ground plane, and a dielectric material between the radiating patch and the ground plane.

6. The system of claim 2, wherein the enclosure comprises a back surface comprising a recess with two or more sockets, and wherein the system further comprises a plug assembly configured to removably connect with each of the two or more sockets such that the plug assembly may be removed from one of the two or more sockets, rotated, and connected to a different one of the two or more sockets.

7. The system of claim 2, wherein generating one or more reports for one or more of the one or more tag filters comprises, for each of the one or more time intervals, for each of the one or more tag filters:

determining whether or not to report the tag filter, and, if it is determined to report the tag filter, generating a report comprising the computed confidence.

8. The system of claim 7, wherein the report further comprises a peak signal strength for the identified one or more tag observations, and a ratio of a standard deviation of signal strengths to average signal strength for the identified one or more tag observations.

9. The system of claim 7, wherein the one or more time intervals comprises a plurality of time intervals, and wherein determining whether or not to report the tag filter comprises:

if a predetermined reporting interval for the tag filter has not expired, determine to not report the tag filter, and, if the predetermined reporting interval has expired, determining at least one difference between the identified one or more tag observations of the time interval and the identified one or more tag observations of a previous time interval, if the at least one difference exceeds a predetermined threshold, determine to report the tag filter, and, if the at least one difference does not exceed the predetermined threshold, determine to not report the tag filter.

10. The system of claim 9, wherein the at least one difference comprises a difference between one or more of the computed confidence, a peak signal strength, and a ratio of a standard deviation of signal strengths to average signal strength for the time interval and the previous time interval.

11. A method for reading Radio Frequency Identifier (RFID) tags, the method comprising, using at least one hardware processor within a pluggable housing to:

receive one or more tag identifiers from one or more RFID tags via at least one antenna;

for each of the one or more tag identifiers, record a tag observation comprising a tag identifier, a timestamp representing a time at which the tag identifier was received, and a signal strength at which the tag identifier was received;

for each of one or more time intervals, for each of one or more tag filters, identify one or more tag observations which satisfy a tag filter and which occurred during a time interval, and compute a confidence that RFID tags satisfying the tag filter were in a field of view of the at least one antenna during the time interval based on the identified one or more tag observations;

generate one or more reports for one or more of the one or more tag filters using one or more computed confidences; and transmit the generated one or more reports to an external system via at least one network.

12. The method of claim 11, wherein the one or more tag filters comprise one or more of a binary bit pattern indicating one or more significant bits, a full tag specification, and a type of asset.

13. The method of claim 11, wherein computing a confidence comprises computing a probability based on a count of the identified one or more tag observations.

14. The method of claim 11, wherein the confidence is computed based on one or more low-pass-filter values for one or more time periods between successive ones of the identified one or more tag observations.

15. The method of claim 11, further comprising using the at least one hardware processor to, for each of the one or more time intervals, for each of the one or more tag filters, compute one or more statistics based on the signal strength of the identified one or more tag observations, wherein generating the one or more reports further uses one or more of the computed one or more statistics.

16. The method of claim 15, wherein the one or more statistics comprise one or more of a peak signal strength, a standard deviation of signal strengths, an average signal strength, and a ratio of the standard deviation of signal strengths to the average signal strength.

17. The method of claim 11, wherein generating one or more reports for one or more of the one or more tag filters comprises, for each of the one or more time intervals, for each of the one or more tag filters:
determining whether or not to report the tag filter, and,
if it is determined to report the tag filter, generating a report comprising the computed confidence.

18. The method of claim 17, wherein the report further comprises a peak signal strength for the identified one or more tag observations, and a ratio of a standard deviation of signal strengths to average signal strength for the identified one or more tag observations.

19. The method of claim 17, wherein the one or more time intervals comprises a plurality of time intervals, and wherein determining whether or not to report the tag filter comprises:
if a predetermined reporting interval for the tag filter has not expired, determine to not report the tag filter, and,
if the predetermined reporting interval has expired,
determining at least one difference between the identified one or more tag observations of the time interval and the identified one or more tag observations of a previous time interval,
if the at least one difference exceeds a predetermined threshold, determine to report the tag filter, and,
if the at least one difference does not exceed the predetermined threshold, determine to not report the tag filter.

20. The method of claim 19, wherein the at least one difference comprises a difference between one or more of the computed confidence, a peak signal strength, and a ratio of a standard deviation of signal strengths to average signal strength for the time interval and the previous time interval.

* * * * *